(12) United States Patent  
Loftus, Jr. et al.

(10) Patent No.: US 9,610,711 B2
(45) Date of Patent: Apr. 4, 2017

(54) SHAPE-DISTORTING TOOLING SYSTEM FOR CURING COMPOSITE PARTS

(71) Applicant: The Boeing Company, Chicago, IL (US)

(72) Inventors: Robert T. Loftus, Jr., Gilbert, AZ (US); Jason M. Robinson, Mesa, AZ (US); Mitchell J. Lee, Scottsdale, AZ (US)

(73) Assignee: The Boeing Company, Chicago, IL (US)

( * ) Notice: Subject to any disclaimer, the term of this patent is extended or adjusted under 35 U.S.C. 154(b) by 119 days.

(21) Appl. No.: 14/617,908

(22) Filed: Feb. 9, 2015

(65) Prior Publication Data

US 2015/0151458 A1 Jun. 4, 2015

Related U.S. Application Data

(62) Division of application No. 13/649,013, filed on Oct. 10, 2012, now Pat. No. 8,986,484.

(51) Int. Cl.
*B29C 33/38* (2006.01)
*B29C 37/00* (2006.01)
(Continued)

(52) U.S. Cl.
CPC .......... *B29C 33/3828* (2013.01); *B29C 33/38* (2013.01); *B29C 35/002* (2013.01);
(Continued)

(58) Field of Classification Search
CPC ............ B29C 33/3828; B29C 33/3835; B29C 70/682; B29C 33/38; B29C 37/005; B29L 2031/082
See application file for complete search history.

(56) References Cited

U.S. PATENT DOCUMENTS 4,223,429 A 9/1980 Robinson
6,458,451 B1 10/2002 Steidl et al.
(Continued)

FOREIGN PATENT DOCUMENTS

CN 101448631 A 6/2009
EP 2439060 4/2012

OTHER PUBLICATIONS

State Intellectual Property Office of PRC, Chinese Office Action dated May 4, 2016 for Appln. No. 201380052712.1.
(Continued)

*Primary Examiner* — William Bell

(57) ABSTRACT

A tooling system may include a cure tool and a biasing element. The cure tool may have a cure tool coefficient of thermal expansion (CTE) and may be configured for curing a composite article formed of two or more components having dissimilar component CTEs. The biasing element may be fixedly attached to the cure tool and has a biasing element CTE that may be different than the cure tool CTE. The biasing element may be configured such that a combination of the cure tool CTE and the biasing element CTE causes a heat-up displacement in the cure tool when heated and the composite article is cured in a distorted shape. When the cured composite article is cooled, the cured composite article may substantially assume an as-designed shape.

20 Claims, 11 Drawing Sheets

(51) Int. Cl.
*B29C 70/44* (2006.01)
*B29C 35/00* (2006.01)
*B29C 35/02* (2006.01)
*B29L 31/08* (2006.01)

(52) U.S. Cl.
CPC ............ *B29C 35/02* (2013.01); *B29C 37/005* (2013.01); *B29C 70/446* (2013.01); *B29K 2995/0012* (2013.01); *B29K 2995/0013* (2013.01); *B29L 2031/082* (2013.01); *Y10T 156/1002* (2015.01)

(56) References Cited

U.S. PATENT DOCUMENTS

| | | | |
|---|---|---|---|
| 2004/0037741 A1* | 2/2004 | Barrellon | B29C 35/0288 422/68.1 |
| 2009/0035406 A1 | 2/2009 | Cleary | |
| 2010/0266416 A1 | 10/2010 | Marshall | |
| 2011/0151125 A1 | 6/2011 | Froeschner | |
| 2011/0194941 A1* | 8/2011 | Parkin | B29C 70/48 416/224 |
| 2012/0131782 A1* | 5/2012 | Petersen | B29C 33/307 29/407.01 |

OTHER PUBLICATIONS

PCT/US2013/059512, International Preliminary Report on Patentability, Apr. 14, 2015.
Li, "Structural Design of Composite Rotor Blades with Consideration of Manufacturability, Durability, and Manufacturing Uncertainties," Aug. 2008.
State Intellectual Property Office of PRC, Chinese Office Action dated Dec. 26, 2016 for Appln. No. 201380052712.1.

\* cited by examiner

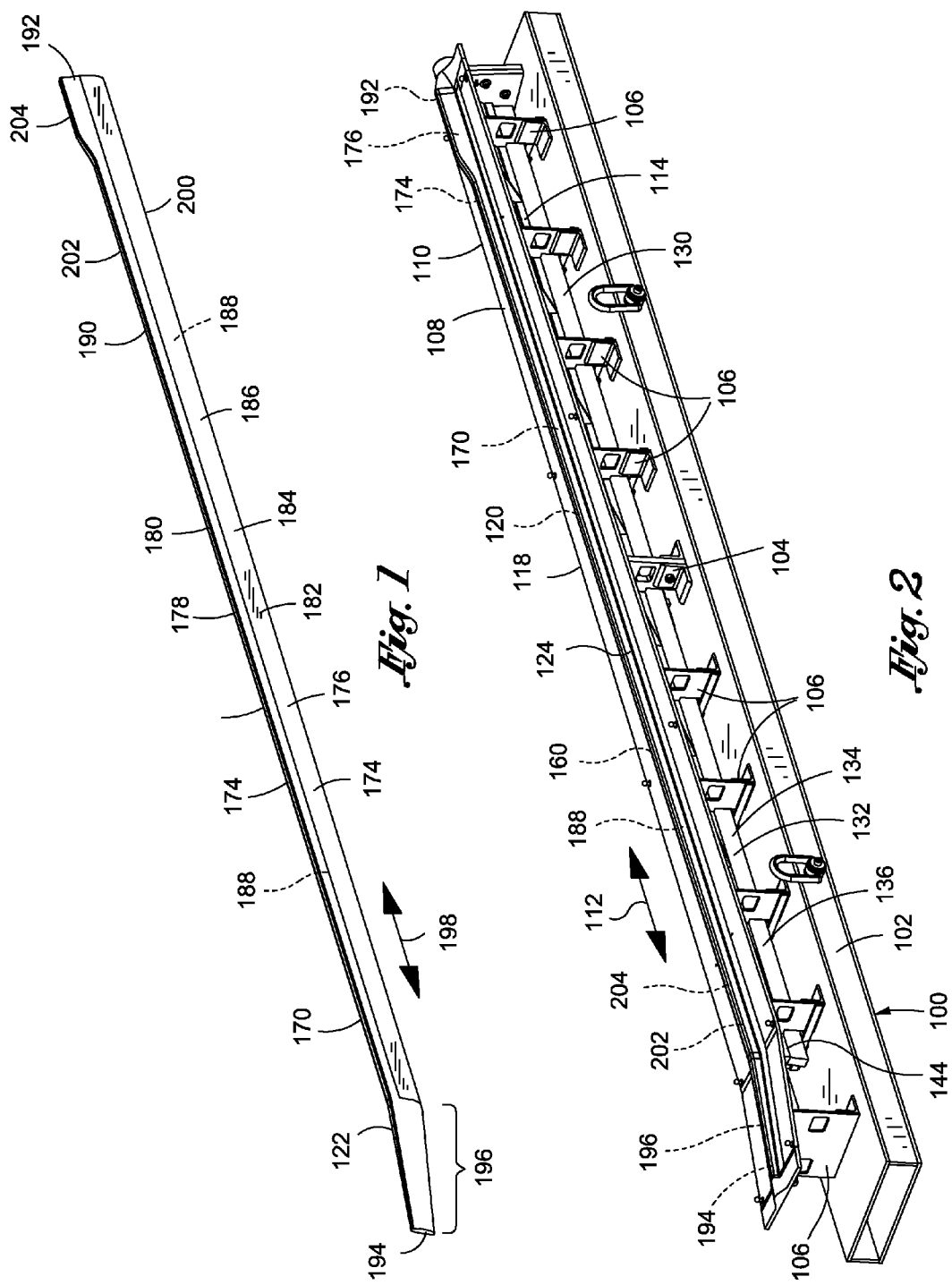

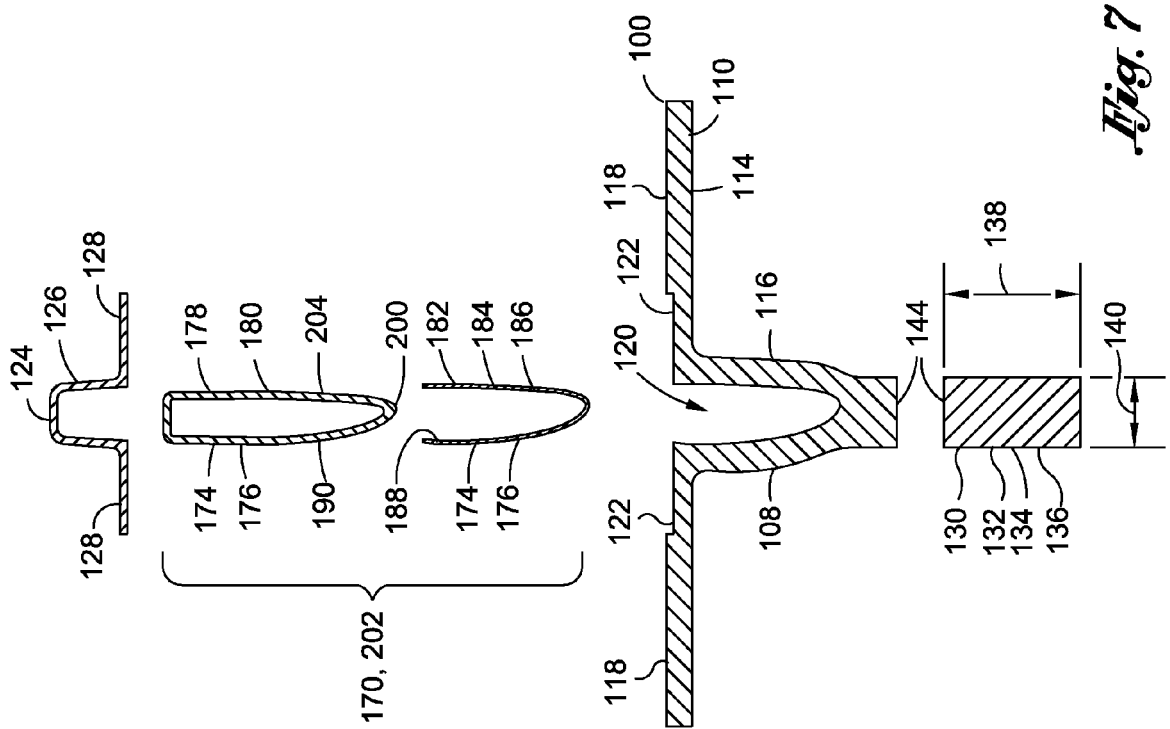

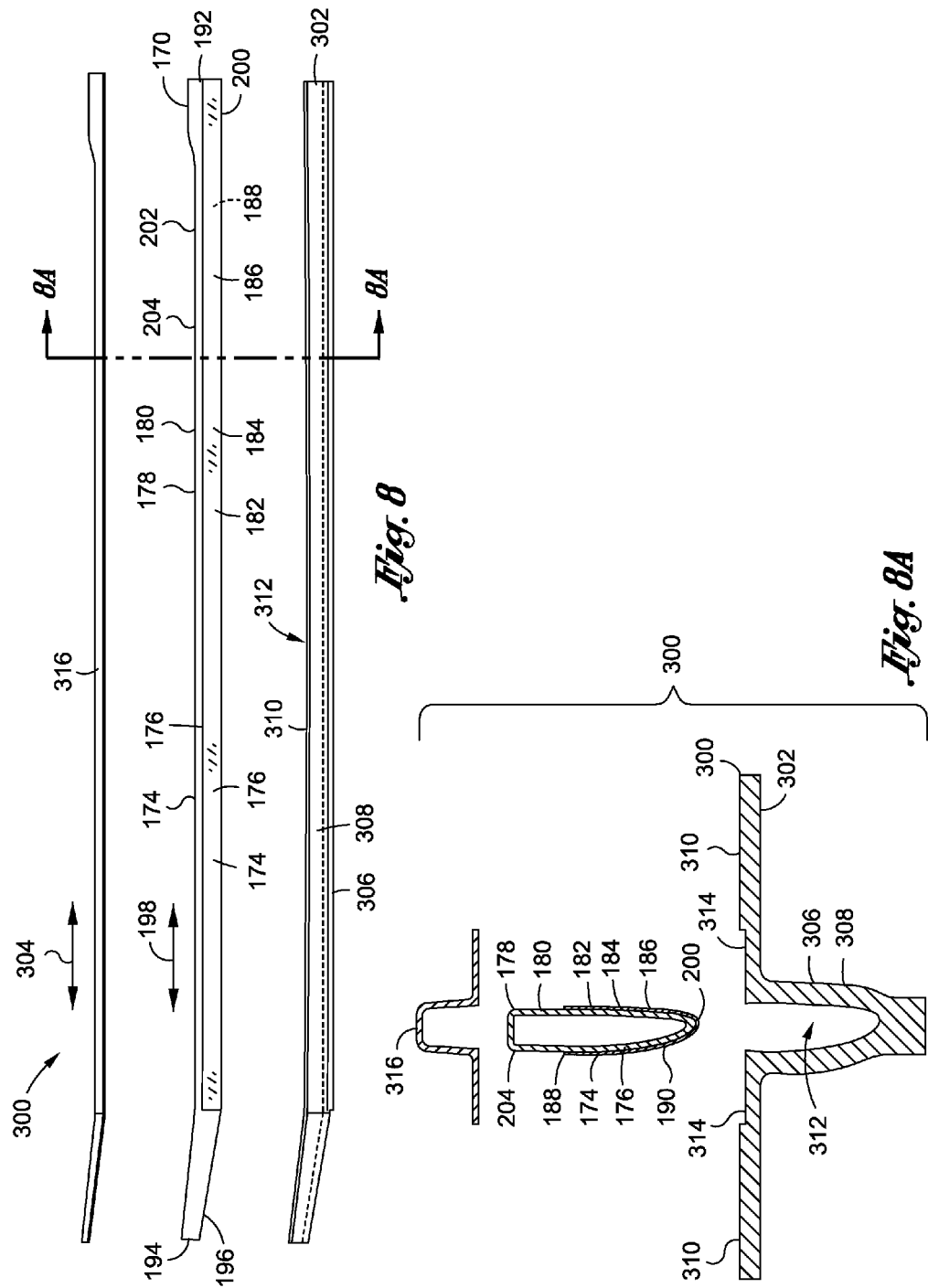

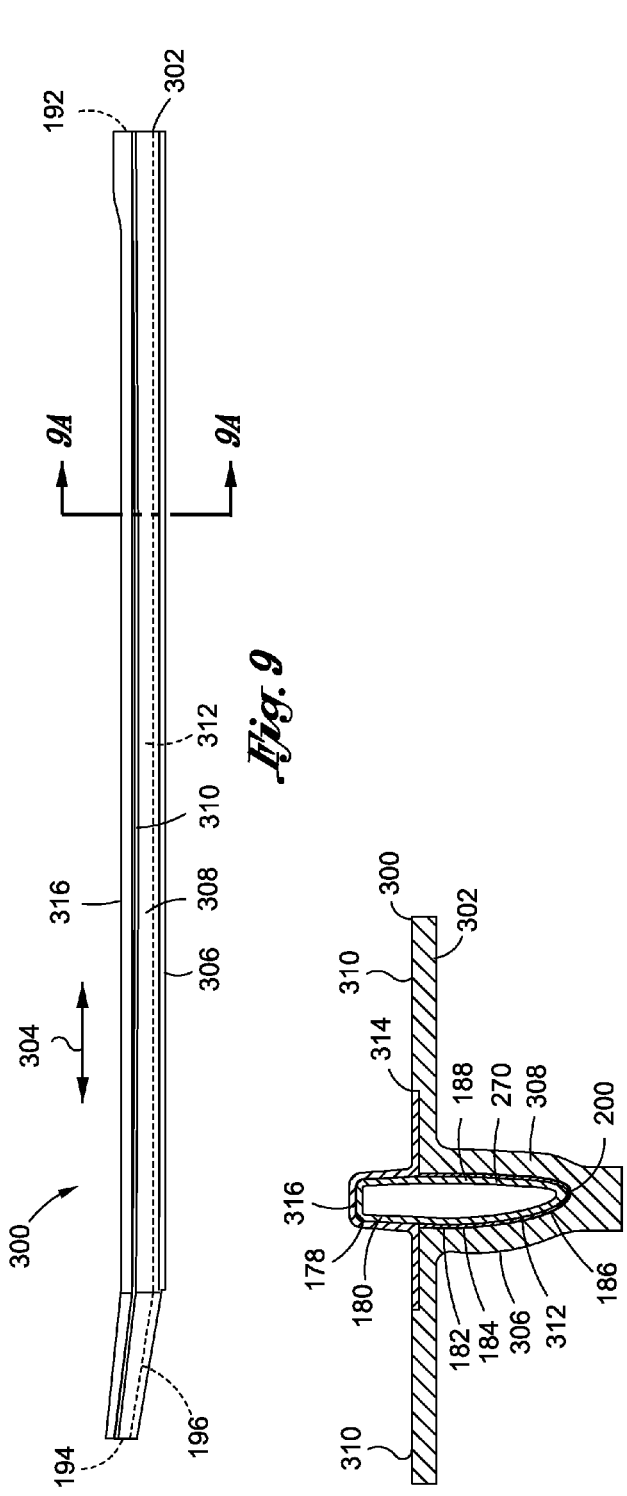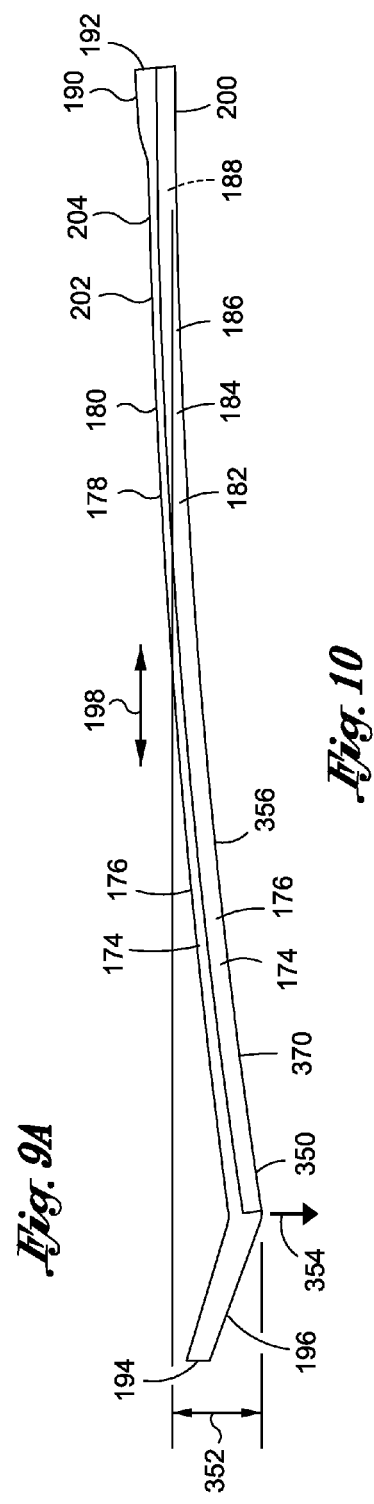

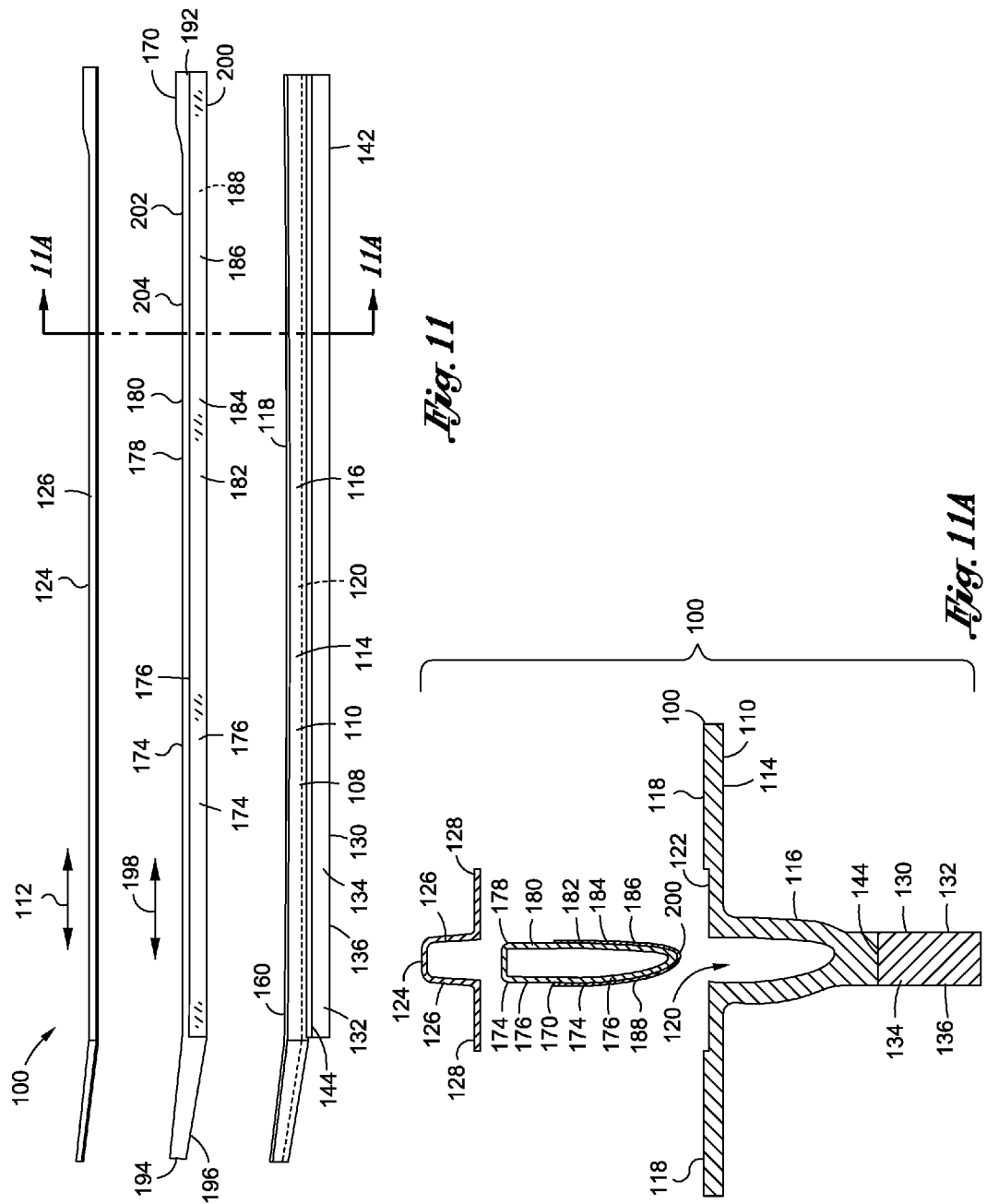

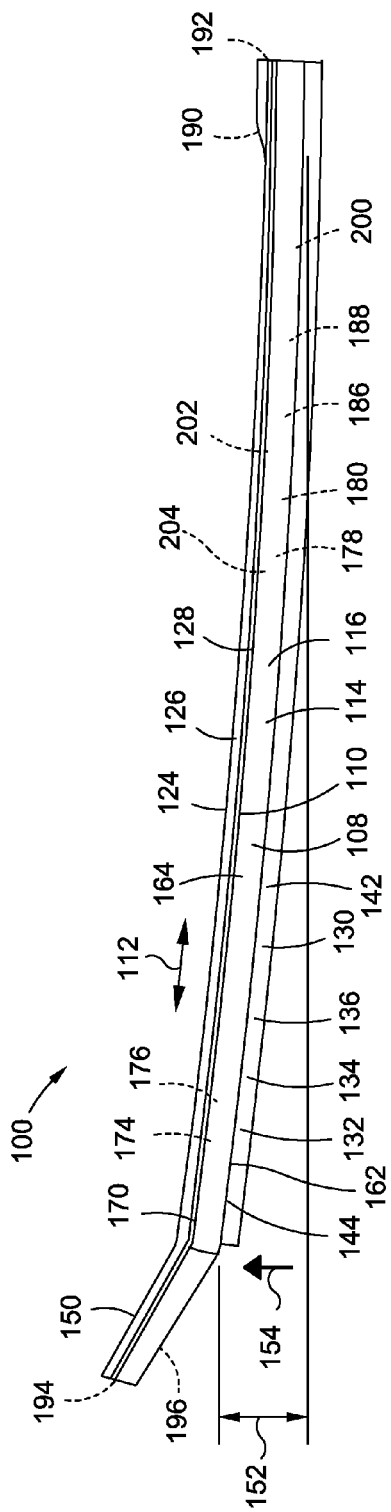
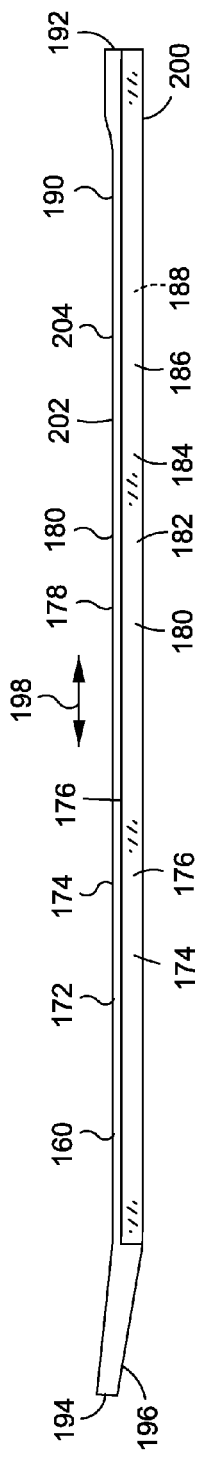
Fig. 12
Fig. 13

SHAPE-DISTORTING TOOLING SYSTEM FOR CURING COMPOSITE PARTS

CROSS-REFERENCE TO RELATED APPLICATIONS

The present application is a divisional application of and claims priority to pending U.S. application Ser. No. 13/649,013 filed on Oct. 10, 2012, and entitled SHAPE-DISTORTING TOOLING SYSTEM AND METHOD FOR CURING COMPOSITE PARTS, the entire contents of which is expressly incorporated by reference herein.

FIELD

The present disclosure relates generally to composites manufacturing and, more particularly, to controlling thermally-induced shape distortion during the curing of composite articles.

BACKGROUND

The main rotor blades of many helicopters and other rotorcraft are fabricated from composite materials due to the superior stiffness and strength properties and corrosion resistance of composites. Such high stiffness and strength properties provide an increased fatigue life for the rotor blades in the high-vibration environment of a helicopter. In addition, composite materials provide a means for tailoring the mass and stiffness characteristics at different locations along the span of a rotor blade to optimize the aeroelastic performance of the rotor blade.

In this regard, a main rotor blade may be constructed with different types of materials positioned at different locations within the airfoil shape of the rotor blade to achieve specific structural stiffness and balance characteristics. Different materials may also be positioned at specific locations along the airfoil shape or material thicknesses may be varied along the length to provide operational durability for the rotor blade. For example, a metallic skin may be included on the leading edge of a composite spar of a rotor blade to provide erosion durability for the rotor blade.

The use of different types of materials for different components within the rotor blade may result in imbalances in the thermal expansion characteristics of the dissimilar materials. For example, the metallic skin may have a coefficient of thermal expansion that is higher that the coefficient of thermal expansion of the composite spar. The metallic skin may be adhesively bonded to the composite spar at an elevated cure temperature inside a cure tool. The differing coefficients of thermal expansion of the metallic skin and composite spar may result in the metallic skin shrinking along a lengthwise direction to a greater extent than the shrinkage of the composite spar. Because of cross-linking that occurs during adhesive cure, a rigid bondline is formed between the metallic skin and composite spar. The rigid bondline results in stress buildup between the metallic skin and the composite spar upon cool down from the cure temperature which may result in shape distortion such as bowing in the cured spar assembly.

Conventional approaches for minimizing shape distortion during the manufacturing of rotor blades include the use of cure tools that are designed to be highly rigid and/or which have a low coefficient of thermal expansion to minimize distortion during the cure cycle in an attempt to maintain the rotor blade in a desired (e.g., straight) shape. Complex holding features may also be incorporated into sub-assembly parts and subsequent cure tools in an attempt to lock the rotor blade components into a desired straight condition. Unfortunately, conventional approaches fail to adequately address the shape distortion (e.g., bowing) that occurs in a composite rotor blade as a result of the imbalance in the dissimilar materials with regard to thermal contraction after cure. Such shape distortion in cured composite subassemblies may present challenges in fitting the cured subassemblies into subsequent cure tools and compromise the integrity of the final part.

As can be seen, there exists a need in the art for a system and method for minimizing or eliminating shape distortion in cured composite articles comprised of dissimilar materials.

SUMMARY

The above-noted needs associated with thermally-induced shape distortion in composite structure are specifically addressed and alleviated by the present disclosure which provides a tooling system having a cure tool and a biasing element. The cure tool has a cure tool coefficient of thermal expansion (CTE) and may be configured for curing a composite article formed of two or more components having dissimilar component CTEs. The biasing element may be fixedly attached to the cure tool and has a biasing element CTE that may be different than the cure tool CTE. The biasing element may be configured such that a combination of the cure tool CTE and the biasing element CTE causes a heat-up displacement into a distorted shape of the cure tool when heated. The composite article may be cured in the distorted shape such that when cooled, the cured composite article may substantially assume an as-designed shape.

In a further embodiment, disclosed is a tooling system, comprising a cure tool having a cure tool coefficient of thermal expansion (CTE) and which may be configured for curing a composite article formed of two or more components having dissimilar component CTEs. The tooling system may further include a biasing element that may be fixedly attached to the cure tool. The biasing element may have a biasing element CTE that is different than the cure tool CTE. The biasing element may be configured such that a combination of the cure tool CTE and the biasing element CTE causes a heat-up displacement in the cure tool when heated to a cure temperature and the composite article is cured in a distorted shape such that when cooled to ambient temperature, the cured composite article substantially assumes an as-designed shape when unrestrained. The biasing element may be fixedly attached to the cure tool at a location on the cure tool such that the heat-up displacement is substantially opposite in direction to a cool-down displacement of a cured composite article cured on a non-biasing cure tool.

Also disclosed is a method of manufacturing a composite article. The method may include providing a cure tool having a biasing element fixedly attached thereto. The cure tool has a cure tool coefficient of thermal expansion (CTE). The biasing element may have a biasing element CTE that is different than the cure tool CTE. The method may include loading a composite article on the cure tool. The composite article may be comprised of components having dissimilar component CTEs. The method may include heating the composite article and the cure tool to a curing temperature. The method may additionally include distorting the cure tool into a distorted shape in response to elevating the temperature of the cure tool to the curing temperature due to the difference in the cure tool CTE and the biasing element CTE. The method may also include curing the composite article in the distorted shape, and then cooling the cured composite article such that the cured composite article changes shape from the distorted shape to an as-designed shape.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective view of a spar assembly of a rotor blade comprising a pre-cured composite D-spar and a metallic erosion strip bonded to the D-spar and wherein the D-spar and the metallic erosion strip may have dissimilar coefficients of thermal expansion (CTEs);

FIG. 2 is a perspective view of an embodiment of a tooling system as may be implemented for bonding the metallic strip to the D-spar leading edge to form the spar assembly illustrated in FIG. 1;

FIG. 7 is an exploded cross-sectional view of the tooling system including the tool cap, the cure tool, the biasing element, and further illustrating the spar assembly that may be bonded to the D-spar using the cure tool;

FIG. 8 is an exploded side view of a non-biasing tooling system that lacks a biasing element;

FIG. 8A is an exploded cross-sectional view of the non-biasing tooling system including a tool cap and a tool base without a biasing element;

FIG. 9 is a side view of the non-biasing tooling system of FIG. 8 in an assembled state;

FIG. 9A is a cross-sectional view of the non-biasing tooling system of FIG. 9;

FIG. 10 is a side view of a spar assembly cured in the non-biasing tooling system and illustrating a cool-down displacement occurring in the spar assembly in the form of bowing along a spanwise direction as a result of the dissimilar coefficients of thermal expansion of the composite D-spar and the metallic erosion strip;

FIG. 11 is an exploded side view of an embodiment of a tooling system as disclosed herein having a biasing element fixedly attached to a lower side of the tool base;

FIG. 11A is an exploded side view of the tooling system of FIG. 11;

FIG. 12 is a side view of a spar assembly being cured in the tooling system of FIG. 11-11A and illustrating a heat-up displacement in the cure tool when heated to a curing temperature due to the difference between the biasing element CTE and the cure tool CTE and causing the spar assembly to be cured in a distorted (e.g., bowed) shape;

FIG. 13 is a side view of the spar assembly removed from the tooling system after cool-down from the curing temperature and resulting in the spar assembly assuming a substantially straight or non-bowed shape along a spanwise direction.

DETAILED DESCRIPTION

Figure 3:
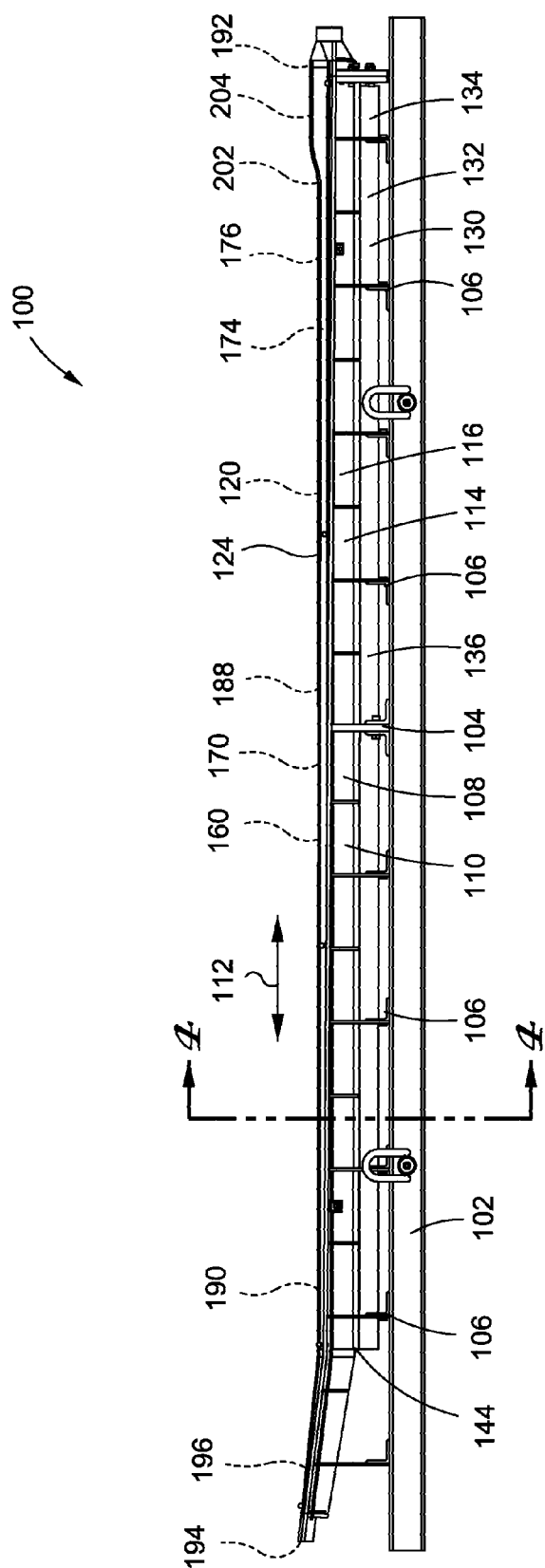
FIG. 3 is a side view of the tooling system illustrating the cure tool supported on a support frame and further illustrating a biasing element fixedly attached to a lower side of a tool base of the cure tool and wherein the biasing element coefficient of thermal expansion (CTE) is different than the cure tool CTE.

Referring now to the drawings wherein the showings are for purposes of illustrating preferred and various embodiments of the disclosure, shown in FIG. 1 is a perspective view of a spar assembly 202 for a rotor blade 190 such as for a helicopter. The spar assembly 202 comprises a composite article 170 containing at least two components 174 having different component coefficients of thermal expansion (CTEs) 176. In this regard, the spar assembly 202 may include a composite component 174 comprising a composite D-spar 204 extending from a root 192 to a tip 194 of the rotor blade 190 and which may have a swept tip portion 196. The composite D-spar 204 may be formed as a composite layup 178 of fiber-reinforced material having a composite layup coefficient of thermal expansion (CTE) 180. The spar assembly 202 may further include a metallic component 182 comprising a metallic strip 186 having a metallic component CTE 184. The metallic strip 186 may be adhesively bonded to a leading edge 200 of the composite D-spar 204 at an elevated cure temperature. Although the metallic strip 186 is shown extending from the root 192 to the swept tip portion 196, the main rotor blade 190 may be constructed such that the metallic strip 186 may terminate at any location such as at the tip 194.

FIG. 2 illustrates an embodiment of a tooling system 100 that may advantageously be used in a manufacturing process for manufacturing a composite article 170 such as the spar assembly 202 illustrated in FIG. 1 without significant shape distortion in the cured composite article 172 (FIG. 1). For example, the tooling system 100 in FIG. 2 may be used for curing an adhesive 188 (FIG. 1) for bonding the metallic strip 186 (FIG. 1) to the composite D-spar 204 at an elevated cure temperature. However, the tooling system 100 as disclosed herein may be configured for manufacturing composite articles 170 having any one of a variety of different sizes, shapes and configurations, without limitation, and is not limited to manufacturing a spar assembly 202 of a rotor blade 190 (FIG. 1).

Furthermore, the tooling system 100 and method disclosed herein is not limited to the curing of adhesive 188 (FIG. 1) for bonding dissimilar components 174. In this regard, the tooling system 100 as disclosed herein may be implemented for any type of elevated-temperature processing of any type of composite article 170 comprised of two or more components 174 (e.g., materials) having dissimilar component CTEs 176. For example, the tooling system 100 and method may be implemented for curing a composite article 170 containing at least one uncured composite layup 178 (FIG. 1) and/or for curing an adhesive 188 in a bonding operation for bonding two components 174 having dissimilar component CTEs 176. The tooling system 100 may also be implemented for co-curing operations and/or for co-bonding operations at elevated processing temperatures, or for any other type of processing elevated temperatures in a composite article 170 comprising least two components 174 having different component CTEs 176.

For example, the tooling system 100 may be implemented for processing a composite article 170 formed of composite components. Such composite components may include composite layups 178 (FIG. 1) formed of fiber-reinforced polymeric material such as a fiber-reinforced thermoplastic matrix or a fiber-reinforced thermosetting matrix or resin such as an epoxy resin or any other type of resin. The thermoplastic resin or thermosetting resin may be reinforced with any one of a variety of different types of fibers including, but not limited to, carbon fibers, glass fibers, aramid fibers, and other types of fibers. The tooling system 100 may also be implemented for processing a composite article 170 containing metallic components, composite components, and/or non-metallic components, or any combination thereof wherein at least two of the components have dissimilar component CTEs 176.

In FIG. 2, the tooling system 100 may include a substantially rigid support frame 102 for supporting the cure tool 108 containing the composite article 170 to be cured. The cure tool 108 may include a cure tool cavity 120 for containing the composite article 170 such as in an as-designed shape 160. The cure tool 108 may advantageously include a biasing element 130 that may be fixedly attached to the cure tool 108. Advantageously, the biasing element 130 may have a biasing element CTE 134 that is different then the cure tool CTE 110. As described in greater detail below, the biasing element 130 may be sized, configured, and positioned on the cure tool 108 such that the combination of the cure tool CTE 110 and the biasing element CTE 134 cause the cure tool 108 to distort when the cure tool 108 and the composite article 170 are heated to a curing temperature. For example, the combination of the cure tool CTE 110 and the biasing element CTE 134 may cause the cure tool 108 to undergo a heat-up displacement 150 (FIG. 12) or shape change when the cure tool 108 and the composite article 170 are elevated to a cure temperature or other processing temperature. The composite article 170 in the cure tool 108 may be cured in the distorted shape 162 (FIG. 12) such that when the composite article 170 is cooled from the cure temperature down to a reduced temperature such as ambient temperature or room temperature, the cured composite article 172 (FIG. 1) may assume an as-designed shape 160 when unrestrained by the cure tool 108, as described in greater detail below.

In FIGS. 2-3, the support frame 102 may include a plurality of braces 104, 106 extending between the support frame 102 and the cure tool 108. The braces 104, 106 may be attached to the cure tool 108 and may be generally vertically oriented and may be spaced apart from one another. One or more of the braces may comprise a fixed brace 104 and the remaining braces may be floating braces 106. For example, in FIGS. 2-3, one of the centrally located braces may be the fixed brace 104 and the remaining braces may be floating braces 106. The fixed brace 104 (e.g., a non-floating brace) may be configured to non-movably secure a point of the cure tool 108 to the support frame 102 to prevent movement of the cure tool 108 relative to the support frame 102 at that location on the cure tool 108. One or more floating braces 106 may be configured to allow the cure tool 108 and biasing element 130 to move in the heat-up displacement 150 (FIG. 12) direction 154 (FIG. 12) while restraining movement of the cure tool 108 in other directions such as twisting movement, lateral movement, or any other movement of the cure tool 108 that is not in the direction 154 of the heat-up displacement 150.

Figure 4:
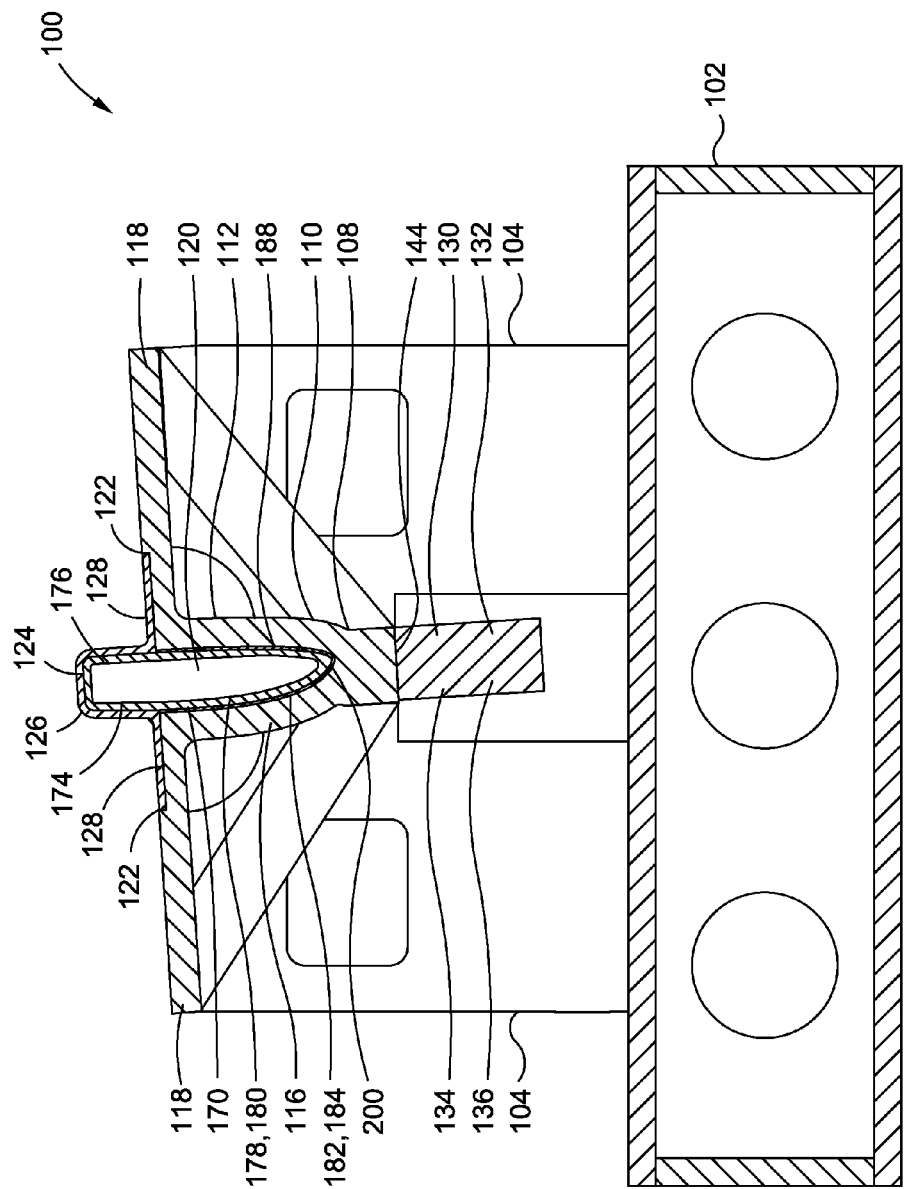
FIG. 4 is a cross-sectional view of the tooling system taken along line 4 of FIG. 3 and illustrating the biasing element attached to the lower side of the tool base and further illustrating the metallic erosion strip and the composite D-spar loaded within a cure tool cavity defined by the tool base and a tool cap
Figure 5:
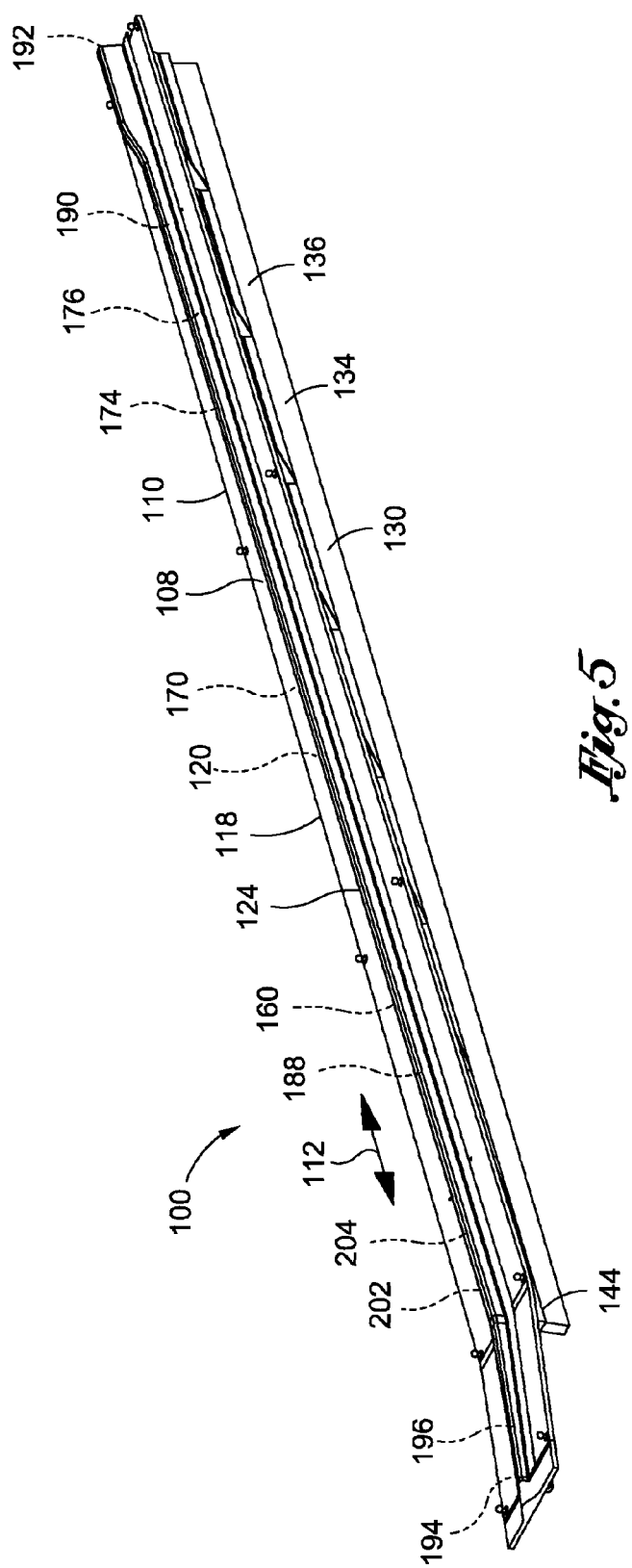
FIG. 5 is a perspective view of the cure tool having a tool cap mounted to an upper side of the tool base and the biasing element fixedly attached to the lower side of the tool base.

Referring to FIG. 4, shown is a cross section of the tooling system 100 illustrating the cure tool 108 supported by braces 104, 106 extending upwardly from the support frame 102. At the location of the cross-section in FIG. 4, the cure tool 108 is shown oriented non-vertically which may illustrate a spanwise blade twist that may be designed into the spar assembly 202 (FIG. 5) of the rotor blade 190 (FIG. 5). The support frame 102 may be configured as a relatively rigid structure configured to provide relatively high torsional stiffness and high bending stiffness to the support frame 102. The high torsional stiffness and bending stiffness of the support frame 102 may restrict or limit movement of the cure tool 108 and biasing element 130 to movement corresponding to the heat-up displacement 150 (FIG. 12). In this regard, the support frame 102 may be configured to substantially prevent or minimize movement of the cure tool 108 such as unwanted twisting movement or lateral movement of the cure tool 108 which the composite article 170 may otherwise undesirably assume during curing at an elevated cure temperature.

In the context of curing a spar assembly 202 (FIG. 5) for a rotor blade 190 (FIG. 5) as described herein, the heat-up displacement 150 (FIG. 12) of the cure tool 108 and the biasing element 130 may include thermally-induced bowing 164 (FIG. 12) of the cure tool 108 and biasing element 130 into the distorted shape 162 when heated as mentioned above. The support frame 102 and the braces 104, 106 may be configured to prevent twisting or lateral movement of the cure tool 108. The support frame 102 and the braces 104, 106 may be configured to allow the cure tool 108 and the biasing element 130 to thermally expand under heating to facilitate bowing 164 of the cure tool 108 into the distorted shape 162 (FIG. 2), such that upon cool down, the cured composite article 172 (FIG. 1) assumes the as-designed shape 160 wherein the cured composite article 172 is substantially straight. The change from the distorted shape 162 at the cure temperature to the as-designed shape 160 at ambient temperature (e.g., room temperature) is a result of thermally-induced mechanical stress occurring in the cured composite article 172 during cool down due to the dissimilar components CTEs 176 of the cured composite article 172.

As may be appreciated, the cure tool 108 and biasing element 130 may be configured in any one of a variety of different shapes, sizes, and configurations to facilitate any type or direction 154 of heat-up displacement 150 in the cure tool 108, and is not limited to heat-up displacement 150 of the cure tool 108 into a bowed shape (FIG. 12). In this regard, the cure tool 108 and the biasing element 130 may be configured such that the heat-up displacement 150 results in multi-dimensional heat-up displacement 150 wherein the cure tool 108 distorts into a complex curvature shape, and is not limited to essentially one-dimensional heat-up displacement 150 such as the one-dimensional bowing of the spar assembly 202 (FIG. 5) as disclosed herein. Furthermore, the cure tool 108 and the biasing element 130 may be configured to cause non-linear heat-up displacement 150 in the cure tool 108 at the elevated cure temperature or processing temperature, as described in greater detail below.

In FIG. 4, in an embodiment, the biasing element 130 may be formed of metallic material such as titanium or other metallic or non-metallic material. The cure tool 108 may be formed of Invar, steel or other alloys. The cure tool 108 may also be formed of composite material or other non-metallic material. The biasing element 130 may be formed of any material having a biasing element CTE 134 that is different than the cure tool CTE 110. In the embodiment shown, the biasing element 130 may be fixedly attached to a lower side of the cure tool 108. For example, the biasing element 130 may be fixedly attached to the cure tool 108 at an interface 144 there between. The tooling system 100 may include cutouts in the braces 104, 106 (FIG. 3) such that the braces 104, 106 are disposed in non-contacting relation to the biasing element 130 to allow unrestricted thermal expansion and contraction of the biasing element 130 during heating and cooling. Alternatively, each brace location on the cure tool 108 may include separate braces 104, 106 on opposite sides of the biasing element 130 and wherein the braces 104, 106 are disposed in non-contacting relation to the biasing element 130 to allow for unrestricted thermal expansion and contraction thereof during heating and cooling.

In FIG. 4, the biasing element 130 may comprise a substantially rigid member formed of any suitable metallic material and/or non-metallic material and wherein the biasing element 130 has a biasing element CTE 134 that is different than the cure tool CTE 110. For example, the biasing element CTE 134 may be lower or higher than the cure tool CTE 110 in order to effectuate a desired direction 154 (FIG. 12) of the heat-up displacement 150 (FIG. 12) of the cure tool 108 into the distorted shape 162 (FIG. 2). In the embodiment shown, the biasing element 130 may be fixedly attached to the cure tool 108. For example, the biasing element 130 may be mechanically fastened, wedded, or otherwise attached to the cure tool 108 in a manner preventing relative movement between the biasing element 130 and the cure tool 108, at least in a lengthwise direction 112 (FIG. 3) of the cure tool 108. In this manner, the thermal expansion and contraction of the biasing may be directly imparted to the cure tool 108. However, it is contemplated that the biasing element 130 may be attached to the cure tool 108 in a manner preventing relative movement therebetween, at least along a direction 154 corresponding to the heat-up displacement 150, and may be floating in a manner allowing relative movement in directions not associated with the heat-up displacement 150.

Referring to FIG. 5, shown is a perspective view of the cure tool 108 and the biasing element 130 with the support frame and braces omitted for clarity. The biasing element 130 may extend from a root 192 end of the cure tool 108 to a location of the swapped tip 194 portion of the composite article 170. However, the biasing element 130 may be configured to extend along any length or portion of the cure tool 108 and is not limited to extending along an entire length of the cure tool 108. Furthermore, the biasing element 130 may be configured as a non-continuous member in order to achieve a desired distorted shape 162 (FIG. 2) in the cure tool 108 when elevated to the cure temperature or other processing temperature. In the embodiment shown, the biasing element 130 may be provided in a biasing element length 142 (FIG. 6) and having a biasing element cross section 136 of any size, shape and configuration, without limitation, to achieve a desired distorted shape in the cured composite article 172 (FIG. 1) prior to cool down.

Figure 6:
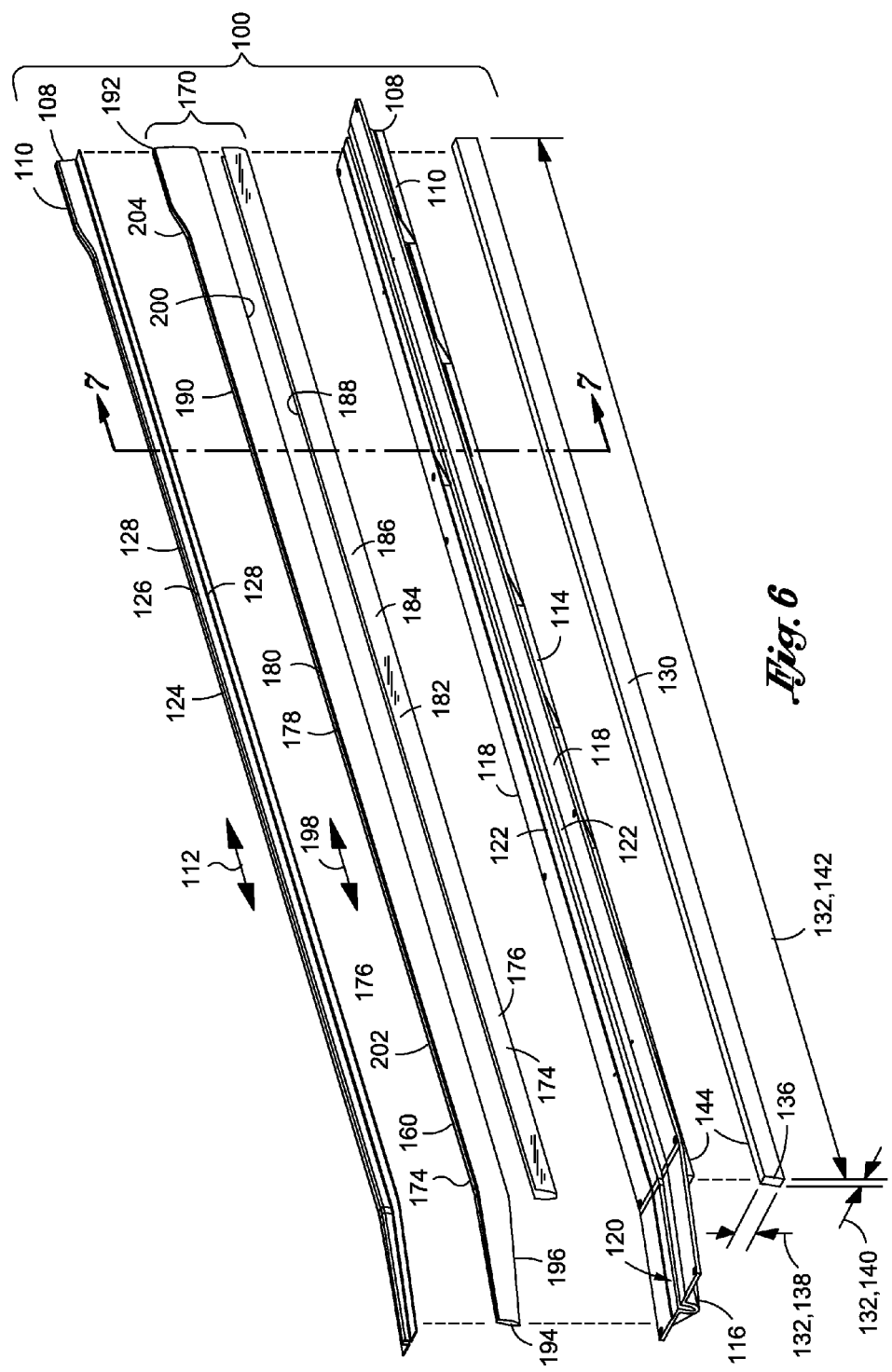
FIG. 6 is an exploded perspective view of the cure tool, the biasing element, and the spar assembly and illustrating the metallic erosion strip and the D-spar that may be loaded into the cure tool.

Referring to FIG. 6, shown is an exploded view of the cure tool 108, the biasing element 130, and the spar assembly 202. In the embodiment shown, the biasing element 130 may be provided in a biasing element length 142 that extends along a lengthwise direction 112 of the cure tool 108. The biasing element 130 may have a biasing element cross section 136 of any size, shape and configuration, without limitation. In this regard, the biasing element 130 is not limited to the generally rectangular shape of the biasing element cross section 136 shown in FIG. 6.

In FIG. 6, the metallic strip 186 (e.g., erosion strep) is shown prior to installation onto the leading edge 200 of the composite D-spar 204 and prior to loading the assembled the metallic strip 186 and composite D-spar 204 into the cure tool cavity 120. The cure tool 108 cap may extend along a length of the cure tool 108 and may be configured to enclose the cure tool cavity 120 for containing the composite article 170 (e.g., the spar assembly 202) to be cured. It should be noted that although the cure tool 108 as disclosed herein includes a female cure tool cavity 120 enclosed by the tool cap 124, the cure tool 108 may be provided in any configuration including a male cure tool configuration (not shown) wherein a composite article such as a composite layup may be applied over the male cure tool. The cure tool 108 may be provided in any size, shape and configuration and may include a biasing element 130 fixedly attached thereto and having a biasing element CTE 134 (FIG. 5) that is different than the cure tool CTE 110 in order to cause a heat-up displacement 150 (FIG. 12) in the composite article 170 that results in the cured composite article 172 (FIG. 1) assuming an as-designed shape 160 upon cool down from the curing temperature.

Referring to FIG. 7, shown is an exploded view of the tooling system 100 including the tool cap 124, the cure tool 108, and the biasing element 130. Also shown is the spar assembly 202 including the metallic strip 186 which may be applied to the composite D-spar 204 and loaded into a cure tool cavity 120 for curing the adhesive 188 for bonding the metallic strip 186 to the composite D-spar 204. The cure tool cavity 120 may be defined by the mold portion 116 and the tool cap 124. The tool base 114 may include a pair of base flanges 118 extending laterally outwardly from the mold portion 116. The tool cap 124 may include a cap portion 126 and a pair of cap flanges 128 extending laterally outwardly from the cap portion 126. The cap flanges 128 may be receivable within a corresponding pair of recesses 122 that may be formed in the base flanges 118 for maintaining the cap portion 126 in registration with the mold portion 116. The tool cap 124 may be configured to be removably mateable to the tool base 114. The cap portion 126 and the mold portion 116 may collectively define or enclose the cure tool cavity 120.

In FIG. 7, the biasing element 130 is shown having a biasing element cross section 136 with a rectangular shape having a biasing element width 140 and a biasing element height 138. However, the biasing element cross section 136 may be provided in any shape and size and is not limited to a rectangular shape. Further in this regard, the biasing element cross section 136 may vary along a length of the cure tool 108. For example, in order to achieve a non-linear distortion of the cure tool 108 during heating to the elevated cure temperature, the biasing element cross section 136 area may be varied by varying the biasing element width 140, biasing element height 138, and/or biasing element shape.

The biasing element 130 is shown mounted on an underside of the tool base 114. Due to the biasing element CTE 134 being different than the cure tool CTE 110, the thermal expansion of the biasing element 130 in a lengthwise direction 112 causes the cure tool 108 and biasing element 130 to undergo a heat-up displacement 150 (FIG. 12) during which the cure tool 108 and biasing element 130 assume a bowed, distorted shape 162 (FIG. 2). As may be appreciated, the biasing element 130 may be fixedly attached to the cure tool 108 at a location on the cure tool 108 such that the heat-up displacement 150 is substantially opposite in direction 154 (FIG. 12) and substantially equivalent in magnitude 152 (FIG. 12) to a cool-down displacement 350 (FIG. 10) of a cured composite article 370 (FIG. 10) cured on a non-biasing cure tool 302 (FIGS. 9-9A) as described in greater detail below.

Referring to FIGS. 8-8A, shown are exploded perspective and sectional views of a non-biasing tooling system 300 that is configured similar to the tooling system 100 shown in FIGS. 2-7 with the exception that the non-biasing tooling system 300 lacks a biasing element 130. The non-biasing tooling system 300 is disclosed herein to illustrate the cool-down displacement 350 (FIG. 10) that occurs when a composite article 170 is cured in a generally non-distorted shape 162 (FIG. 2) at an elevated cure temperature and which then distorts upon cool down to ambient temperature. In FIGS. 8-8A, the non-biasing tooling system 300 includes a non-biasing cure tool 302 having a lengthwise direction 304. The non-biasing cure tool 302 may include a tool base 306 having a mold portion 308 and a pair of base flanges 310. They may include a tool cap 124 (FIG. 7) having a cap portion 126 (FIG. 7) and a pair of cap flanges 128 (FIG. 7) to engage the base flanges 310. The composite article 170 cured in the non-biasing tooling system 300 may have substantially the same configuration as the tooling system 100 shown in FIGS. 2-7.

Referring to FIGS. 9-9A, shown are views of the non-biasing tooling system 300 of FIG. 8-8A in an assembled state. The composite article 170 (FIG. 8) may be loaded into the cure tool cavity 312 of the tool base 314. The temperature of the non-biasing tooling system 300 may be elevated to a cure temperature. Upon heating of the non-biasing tooling system 300 to the elevated cure temperature, the tool base 314 and tool cap 316 may thermally expand in a generally non-bowed shape or a straight shape.

Referring to FIG. 10, shown is a side view of a cured spar assembly 202 that may be cured in the non-biasing tooling system 300 illustrated in FIGS. 8-9A. FIG. 10 illustrates a cool-down displacement 350 that may occur during cooling of the cured spar assembly 202 in the form of bowing 164 along a spanwise direction 198 of the cured spar assembly 202. The cured spar assembly 202 has a cool-down displacement 350 magnitude 352 and direction 354. The bowing 356 in the cured spar assembly 202 may occur as a result of the dissimilar CTEs of the metallic strip 186 and the composite D-spar 204. In this regard, the cooling of the cured spar assembly 202 represents the response of a cured composite article 172 (FIG. 1) to thermally-induced mechanical stress imbalance in the cured composite article 172 due to the dissimilar component CTEs 176.

Referring to FIGS. 11-11A, shown are exploded perspective and sectional views of the tooling system 100 illustrated in FIGS. 2-7. The tooling system 100 advantageously includes the biasing element 130 fixedly attached to the tool base 114. As described above, the biasing element 130 may be attached to a side of the cure tool 108 (e.g., a lower side) that is located opposite the cool-down displacement 350 direction (FIG. 10) of the cured composite article 370 (FIG. 10) that is cured on the non-biasing tooling system 300 shown in FIGS. 8-9A.

Referring to FIG. 12, shown is a side view of the tooling system 100 at the elevated cure temperature and illustrating a heat-up displacement 150 in the cure tool 108 when heated to a curing temperature. As indicated above, the tooling system 100 may assume a distorted shape 162 (e.g., a bowed shape) corresponding to the heat-up displacement 150 as a result of the biasing element CTE 134 being different than the cure tool CTE 110. In an embodiment, the biasing element 130 may have a biasing element CTE 134 and a biasing element cross section 136 that results in the magnitude 152 of the heat-up displacement 150 of the cure tool 108 being substantially equivalent to the magnitude 352 (FIG. 10) of the cool-down displacement 350 (FIG. 10) of the cured spar assembly 202 using the non-biasing tooling system 300 shown in FIG. 8-9A.

Referring to FIG. 13, shown is the cured spar assembly 202 removed from the tooling system 100 (FIG. 12) after cool-down from the elevated curing temperature. Due to thermally-induced stress imbalance in the cured spar assembly 202 caused by the difference in the CTE of the metallic strip 186 relative to the CTE of the composite D-spar 204, the cured spar assembly 202 may assume the as-designed shape 160 which may advantageously comprise a generally straight or non-bowed shape of the spar assembly 202 along a spanwise direction 198.

Figure 14:
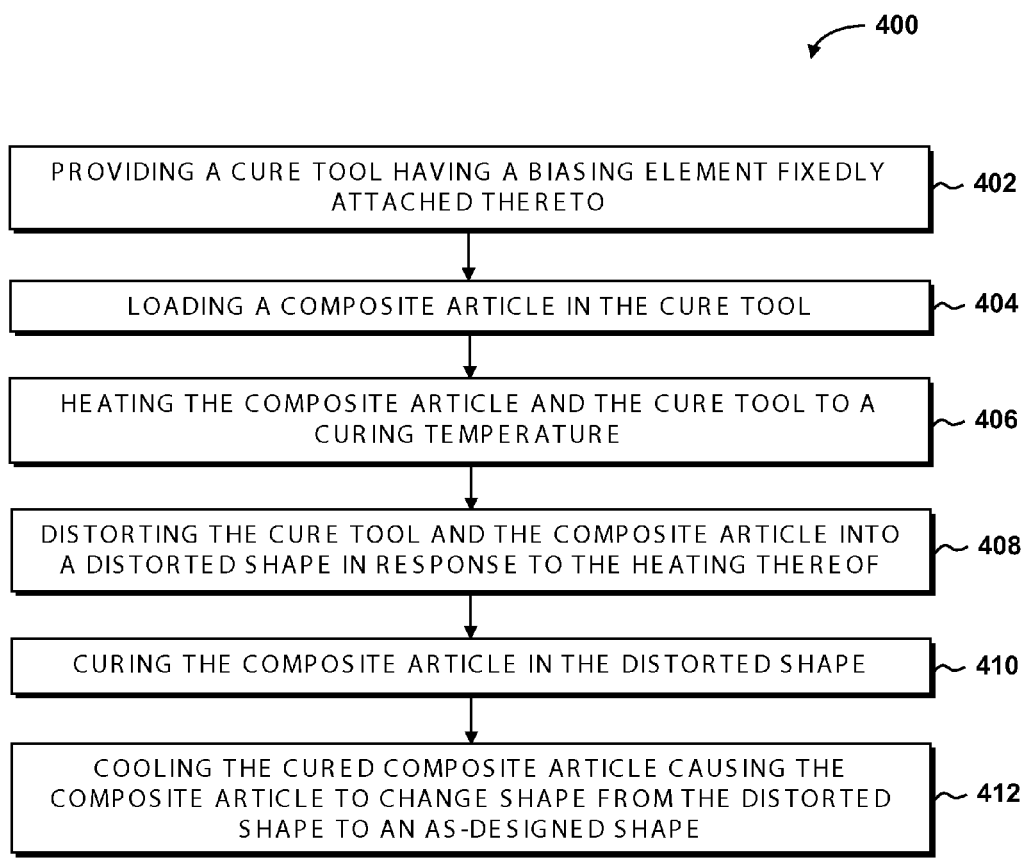
FIG. 14 is a flow diagram illustrating one or more operations that may be included in a method of manufacturing a composite article.

Referring to FIG. 14, shown is a flow diagram illustrating one or more operations that may be included in a method 400 of manufacturing a cured composite article 172 (FIG. 1). Advantageously, the method provides a means for exploiting the thermally-induced mechanical stress imbalance occurring in a composite article 170 (FIG. 1) formed of components 174 (FIG. 1) having differing component CTEs 176 (FIG. 1).

Step 402 of the method 400 of FIG. 14 may include providing a cure tool 108 (FIG. 3) having a biasing element 130 (FIG. 3) fixedly attached thereto. As was indicated above, the biasing element 130 may have a biasing element CTE 134 (FIG. 3) that is different than the cure tool CTE 110 (FIG. 3). For example, the biasing element CTE 134 may be higher or lower than the cure tool CTE 110. In FIGS. 2-8, the biasing element 130 has a constant cross section 136 shape and size along the length of the biasing element 130. For a cure tool 108 having a generally constant cross section 136 shape and size, the biasing element 130 configuration shown in FIGS. 2-8 may result in linear displacement of the cure tool 108 along a lengthwise direction 112 of the cure tool 108.

However, the cure tool 108 (FIG. 7) may be provided in an embodiment wherein the biasing element 130 (FIG. 7) has at least one biasing element parameter 132 (FIG. 7) that varies linearly or non-linearly along a length of the cure tool 108. Examples of biasing element parameters 132 that may be varied along a length of the cure tool 108 include, but are not limited to, the biasing element CTE 134, the biasing element cross section 136 (FIG. 7), and/or the biasing element 130 stiffness or Young's modulus. The biasing element cross section 136 may include the cross-section size and/or the cross-section shape. For example, in FIG. 7, the biasing element 130 includes a generally rectangular cross section having a biasing element width 140 and a biasing element height 138. The biasing element width 140 and/or the biasing element height 138 may be varied along a length of the biasing element 130 to vary the cross section area of the biasing element 130 and achieve a non-linear heat-up displacement 150 (FIG. 12) in the cure tool 108. The biasing element cross-section 136 shape may also be varied along a length of the biasing element 130. For example, the biasing element 130 may be provided in a cross section that changes from a rectangular shape to a different cross section shape such as an I-beam shape or any other shape in order to cause the cure tool 108 to distort into a specific distorted shape 162 (FIG. 12).

The biasing element parameters 132 (FIG. 6) may be varied non-linearly along the length of the cure tool 108

(FIG. 6) to cause a heat-up displacement 150 (FIG. 12) in the cure tool 108 that is non-linear at the processing temperature. In this manner, the composite article 170 (FIG. 6) may cure in a specific distorted shape 162 (FIG. 12) that results in the cured composite article 172 (FIG. 11) assuming a specific as-designed shape 160 (FIG. 13) upon cool down to ambient temperature. For example, one or more of the biasing element parameters 132 may be varied non-linearly along a length of the cure tool 108 to correspond to non-linear thermally induced stress in the cured composite article 172 (FIG. 11) as may result from a tapered thickness in the metallic strip 186 (FIG. 6) along a length of the spar assembly 202 (FIG. 6).

Further in this regard, the tooling system 100 may include two or more individual biasing elements 130 (FIG. 6) that may be fixedly attached to the tool base 114 (FIG. 6). The biasing elements 130 may have dissimilar biasing element parameters 132. For example, two or more individual biasing elements 130 formed of different materials having dissimilar CTEs may be joined end-to-end and fixedly attached to the tool base 114. Upon heating the cure tool 108 (FIG. 6) and the biasing elements 130 to the designated curing temperature or processing temperature, a non-linear heat-up displacement 150 (FIG. 12) may be generated in the cure tool 108 to correspond to non-linear cool-down displacement 350 (FIG. 10) that may occur in a cured composite article 172 (FIG. 13) as a result of non-linear geometric of mechanical properties of one or more of the components of the composite article 172. For example, the metallic strip 186 (FIG. 6) of the spar assembly 202 (FIG. 6) may have a tapered thickness along a length of the D-spar 204 (FIG. 6).

Step 404 of the method 400 of FIG. 14 may include loading a composite article 170 (FIG. 6) on or in the cure tool 108 (FIG. 6). The composite article 170 may be comprised of two or more components 174 (FIG. 6) having dissimilar component CTEs 176 (FIG. 6). For example, in FIG. 6, the metallic strip 186 of the spar assembly 202 may have a metallic component CTE 184 that is different that the composite component CTE 176 of the composite D-spar 204. However, the composite article 170 may include components 174 formed of any material, without limitation. For example, one or more of the composite articles 170 may comprise an uncured composite layup, a pre-cured composite layup, a metallic component, an adhesive, or any of the type of metallic component or non-metallic component, without limitation.

Step 406 of the method 400 of FIG. 14 may include heating the composite article 170 (FIG. 7) and the cure tool 108 (FIG. 7) to an elevated curing temperature. In this regard, the composite article 170 may be loaded onto or in the cure tool 108 at ambient temperature or room temperature or other temperature. The cure tool 108 may then be positioned inside an autoclave (not shown) and the temperature may be elevated to the designated cure temperature required for curing adhesive 188 (FIG. 7) for bonding the metallic strip 186 (FIG. 7) to the composite D-spar 204 (FIG. 7). However, the cure tool 108 and composite article 170 may be heated by any means and are not limited to heating using an autoclave.

Furthermore, the cure tool 108 (FIG. 7) in composite article 170 (FIG. 7) may be heated to any temperature and are not limited to heating to the cure temperature of an adhesive 188 (FIG. 7) or the cure temperature of a composite layup 178 (FIG. 7). For example, the cure tool 108 and the biasing element 130 (FIG. 7) may be elevated to a temperature that is higher than the curing temperature of an adhesive 188 or a composite layup 178, and which may effectuate an increased amount of heat-up displacement 150 (FIG. 12) in the cure tool 108. By causing an increased amount of heat-up displacement 150 in the cure tool 108, the cured composite article 172 (FIG. 7) may undergo an increased amount of shape change upon cool down to ambient temperature.

Step 408 of the method 400 of FIG. 14 may include distorting the cure tool 108 (FIG. 12) and the composite article 170 (FIG. 12) into a distorted shape 162 (FIG. 12) associated with a heat-up displacement 150 (FIG. 12) in response to elevating the temperature of the cure tool 108 to the curing temperature. The distortion may occur in the cure tool 108 as a result of the difference in the cure tool CTE 110 (FIG. 12) relative to the biasing element CTE 134. For example, FIG. 12 illustrates the cure tool 108 distorting into a bowed shape along a lengthwise direction 112 when heated to the curing temperature.

Step 410 of the method 400 of FIG. 14 may include curing the composite article 170 (FIG. 12) in the distorted shape 162 (FIG. 12). In FIG. 12, when the composite article 170 is at the curing temperature, the adhesive 188 between the metallic strip 186 and the composite D-spar 204 may cure. In an embodiment, the composite article 170 may include an uncured composite layup 178 (e.g., prepreg composite plies) having a resin matrix that may cure (e.g., for thermosetting resin) when held at a designated curing temperature for a designated period of time, and/or solidify (e.g., for thermoplastic resin) when cooled to a temperature below a glass transition temperature of the thermoplastic resin.

Step 412 of the method 400 of FIG. 14 may include cooling the cured composite article 172 (e.g., to ambient temperature) (FIG. 13) such that the cured composite article 172 changes shape from the distorted shape 162 (e.g., at the cured temperature) (FIG. 12) to an as-designed shape 160 (e.g., at ambient temperature) when the cured composite article 172 (FIG. 13) is removed from the cure tool 108 (FIG. 12) or the cured composite article 172 is otherwise unrestrained. For example, FIG. 13 illustrates the cured spar assembly 202 substantially straightening out when cooled to a reduced temperature (e.g., ambient temperature) due to the thermally-induced stress caused by the dissimilar CTEs of the metallic strip 186 and the composite D-spar 204.

In an embodiment, the method disclosed herein may include forming, using the tooling system 100 (FIG. 7), a helicopter rotor blade 190 (FIG. 7) from any type of component such as from one or more uncured or pre-cured composite layup 178 (e.g., a composite D-spar 204) and any metallic components such as a metallic strip 186 (FIG. 7) that may be laminated with the composite layup 178. However, the tooling system 100 may be implemented for forming any one of a variety of different composite articles 170 (FIG. 7) having two or more components 174 (FIG. 7) with dissimilar component CTEs 176 (FIG. 7), and is not limited to forming a rotor blade 190.

In an embodiment not shown, the cure tool 108 and biasing element 130 may be configured such that after heating the cure tool 108 and the biasing element 130 to an elevated temperature to cause a heat-up displacement 150 and allowing the composite article 170 to cure, the cured composite article 172 undergoes a shape change into a final as-designed shape that may be a curved shape. For example, although not shown in the figures, a cure tool 108 and biasing element 130 may be initially configured to hold the uncured composite article 170 in a curved shape prior to heating. The cure tool 108 and the biasing element 130 may be heated to an elevated cure temperature causing the cure tool 108 and the biasing element 130 to undergo a heat-up displacement into a distorted shape such as a straight shape. Upon cool down such as to ambient temperature, the cured composite article 172 may assume a curved shape.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A tooling system, comprising:
a cure tool having a cure tool coefficient of thermal expansion (CTE) and configured for curing a composite article formed of two or more components having dissimilar component CTEs;
a biasing element fixedly attached to the cure tool along a lengthwise direction of the cure tool in a manner preventing relative movement between the biasing element and the cure tool along the lengthwise direction, the biasing element having a biasing element CTE that is different than the cure tool CTE; and
the biasing element being configured such that a combination of the cure tool CTE and the biasing element CTE causes a heat-up displacement of the cure tool and biasing element along a direction non-parallel to the lengthwise direction when the cure tool and biasing element are heated and the composite article is cured in a distorted shape on the heated cure tool such that when cooled, the cured composite article substantially assumes an as-designed shape due to the dissimilar component CTEs of the composite article.

2. The tooling system of claim 1, wherein:
the biasing element is fixedly attached to the cure tool at a location such that the heat-up displacement is substantially opposite in direction to a cool-down displacement of a cured composite article cured on a non-biasing cure tool.

3. The tooling system of claim 1, wherein:
the biasing element is configured such that the heat-up displacement is substantially equivalent in magnitude to the cool-down displacement of a cured composite article cured on a non-biasing cure tool.

4. The tooling system of claim 1 wherein:
the heat-up displacement comprises bowing along the lengthwise direction of the cure tool.

5. The tooling system of claim 1 wherein:
the heat-up displacement comprises twisting of the cure tool along the lengthwise direction.

6. The tooling system of claim 1 wherein:
the biasing element has at least one biasing element parameter that varies along a length of the cure tool, the biasing element parameter including at least one of the following:
the biasing element CTE;
a biasing element cross section; and
a biasing element stiffness.

7. The tooling system of claim 6 wherein:
the biasing element parameter varies non-linearly along the lengthwise direction of the cure tool.

8. The tooling system of claim 6 wherein:
the biasing element comprises at least two biasing elements having dissimilar biasing element parameters; and
the biasing elements being configured to generate non-linear heat-up displacement in the cure tool.

9. The tooling system of claim 1 further comprising:
a support frame for supporting the cure tool and configured to limit movement of the cure tool to a direction associated with the heat-up displacement.

10. The tooling system of claim 9 wherein:
the cure tool is fixedly secured to the support frame at one location on the support frame in such a manner preventing movement of the cure tool relative to the support frame at the one location; and
the cure tool being non-movably secured to the support frame at one or more remaining locations on the support frame in such a manner allowing the cure tool and the biasing element to move along a direction of the heat-up displacement at the remaining locations.

11. The tooling system of claim 1 wherein:
the cure tool and the biasing element are configured such that the heat-up displacement is one-dimensional heat-up displacement.

12. The tooling system of claim 1 wherein:
the cure tool and the biasing element are configured such that the heat-up displacement is multi-dimensional heat-up displacement during which the cure tool distorts into a complex curvature shape.

13. The tooling system of claim 1 wherein:
the components of the composite article include a composite layup having a composite layup CTE, and a metallic component having a metallic component CTE that is different than the composite layup CTE.

14. The tooling system of claim 1 wherein:
the cure tool is configured to cure a spar assembly of a rotor blade.

15. The tooling system of claim 1 wherein:
at least one of the cure tool and the biasing element is formed of metallic material and/or non-metallic material.

16. The tooling system of claim 15 wherein:
the metallic material comprises at least one of steel, titanium, Invar; and
the non-metallic material comprises ceramic material and composite material including fiber-reinforced polymeric material.

17. A tooling system for a composite assembly, comprising:
a cure tool having a cure tool coefficient of thermal expansion (CTE) and configured for curing a composite article formed of two or more components having dissimilar component CTEs;
a biasing element fixedly attached to the cure tool along a lengthwise direction of the cure tool in a manner preventing relative movement between the biasing element and the cure tool along the lengthwise direction, the biasing element having a biasing element CTE that is different than the cure tool CTE;
the biasing element being configured such that a combination of the cure tool CTE and the biasing element CTE causes a heat-up displacement of the cure tool and biasing element along a direction non-parallel to the lengthwise direction when the cure tool and biasing element are heated to a cure temperature and the composite article is cured in a distorted shape on the heated cure tool such that when cooled to ambient temperature, the cured composite article substantially assumes an as-designed shape when unrestrained due to the dissimilar component CTEs of the composite article; and
the biasing element being fixedly attached to the cure tool at a location such that the heat-up displacement of the cure tool is substantially opposite in direction to a cool-down displacement of a composite article cured on a non-biasing cure tool.

18. The tooling system of claim 17 wherein:
the heat-up displacement is substantially equivalent in magnitude to a cool-down displacement of a cured composite article cured on a non-biasing cure tool.

19. A tooling system for curing a composite spar assembly of a helicopter rotor blade, comprising:
a cure tool having a cure tool cavity configured to receive a composite spar assembly of a rotor blade having a composite layup coefficient of thermal expansion (CTE) and a metallic strip CTE that is different than the composite layup CTE, the cure tool having a cure tool CTE;
a biasing element fixedly attached to the cure tool along a lengthwise direction of the cure tool in a manner preventing relative movement between the biasing element and the cure tool along the lengthwise direction, the biasing element having a biasing element CTE that is different than the cure tool CTE; and
the biasing element being configured such that a combination of the cure tool CTE and the biasing element CTE causes a heat-up displacement of the cure tool and biasing element along a direction non-parallel to the lengthwise direction when the cure tool and biasing element are heated and the composite spar assembly is cured in a distorted shape on the heated cure tool such that when cooled, the cured composite spar assembly substantially assumes an as-designed shape due to the metallic strip CTE being different than the composite layup CTE of the composite spar assembly.

20. The tooling system of claim 19 wherein:
the cure tool has a tool base and a tool cap collectively defining the cure tool cavity configured to contain the composite spar assembly; and
the tool cap being removably mateable to the tool base for loading and removing the composite spar assembly from the cure tool cavity.

* * * * *